Figure 1:
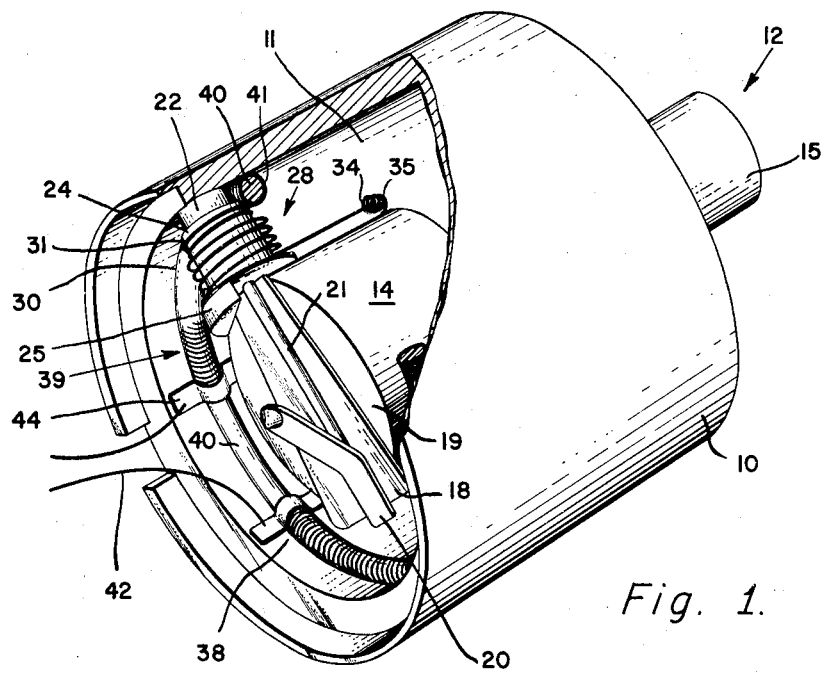

Sept. 8, 1964   W. R. TATE ETAL   3,148,350
ELECTRICAL POTENTIOMETER
Filed April 30, 1962

3,148,350
ELECTRICAL POTENTIOMETER

Willard R. Tate, Culver City, and Ralph E. Hendrickson, Glendale, Calif., assignors to Hughes Aircraft Company, Culver City, Calif., a corporation of Delaware
Filed Apr. 30, 1962, Ser. No. 189,727
6 Claims. (Cl. 338—143)

This invention relates to an electrical potentiometer and more particularly to a potentiometer having a wiper that is adapted to change the resistance of the potentiometer by rolling as well as by sliding along a resistance element.

In recent years, primarily because of the increased importance of electronic equipment, many and varied types of potentiometers have been developed. With respect to the mechanism used for providing a movable contact along the resistance element, potentiometers can be generally classified into two categories, a sliding contact wiper type and a rolling contact wiper type.

Because of the reduced friction of a rolling wiper, the use of a rolling wiper potentiometer has been found desirable where a primary consideration in the choice of the potentiometer is the reduction of the wear between the wiper and the resistance element. However, in potentiometers of the rolling wiper type the rotation of the wiper on its support shaft is a source of electrical noise. In addition, any dirt or other contamination getting on the windings of the resistance element will not be cleaned off by the wiping action present in a sliding contact wiper but instead will be rolled into the winding by the wiper, thus causing noise or intermittent contact between the wiper and resistance element. Therefore, while the rolling wiper type of potentiometer has disadvantages, because of the noise generated by it, its chief advantage of reduced friction and wear of the wiper and resistance element frequently makes its use highly desirable.

On the other hand, the sliding contact wiper, because of its continual contact with the resistance element, has the disadvantage of having high wear and friction properties. However, since the wiper slides over the windings of the resistance element this type of potentiometer develops low noise properties because the sliding action will wipe the windings clean of any contaminants.

It has been found, under certain environments, that a potentiometer may be subjected to extensive vibration or dither forces. A dither force is defined in the art as a force applied continuously to a device driven by a servo motor so that the device is constantly in small amplitude motion and cannot stick at its null point. Because of these forces the wiper of a sliding contact wiper type of potentiometer will wear through the windings of the resistance element of the potentiometer. While a rolling contact wiper type of potentiometer will not as readily wear through the windings of the resistance element of the potentiometer, its use also has been found undesirable because of the increased noise properties of these potentiometers.

It is therefore an object of the present invention to provide a potentiometer with reduced wear and friction properties.

It is another object of this invention to provide a potentiometer with reduced noise properties.

It is a further object of the present invention to provide a potentiometer having a wiper that will roll rather than slide in applications involving extensive dither or vibration environments but will slide when acted upon by all other forces.

In general, in its preferred form, the present invention includes a constrained movable roller wiper which is adapted to both roll and slide. The rolling action of the wiper is limited by mechanical stops that are attached to the wiper. The wiper is in intermediate contact with a continuous resistance element to the ends of which is applied a source of electrical potential. Electrical contact is made to the wiper through a hair-spring connection. During vibration or dither the roller action of the wiper decreases wear of the winding. For large angular displacements the roller is constrained by the mechanical stops and normal sliding contact action occurs. In this fashion the present invention incorporates the desirable feature of reduced wear of the rolling contact wiper type of potentiometer when it is subjected to extensive vibration or dither forces and the desirable feature of reduced noise of the sliding contact wiper type of potentiometer when it is subjected to normal operating forces.

Figure 2:
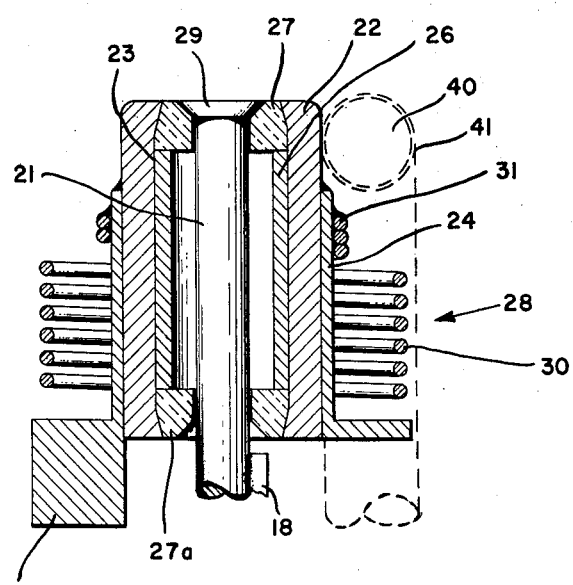

Other advantages of the present invention will hereinafter become more fully apparent from the following descriptions of the drawings which illustrate a preferred embodiment, and wherein FIGURE 1 is a partial cut-away perspective view of the present invention showing the constrained roller wiper, and FIGURE 2 is a median sectional view of the constrained roller wiper of the present invention showing the principal elements thereof.

Referring now to the drawings, FIGURE 1 illustrates an embodiment of the present invention wherein a potentiometer is housed in a casing or body 10. The body 10 is preferably cylindrical in form and includes a cavity 11 and terminates at one end in an end face or wall having a central aperture therethrough (not shown). A shaft 12 extends through the aperture into the cavity 11 coaxially with the longitudinal axis of said cavity. The shaft 12 includes a first portion 14 and a second portion 15 of smaller diameter than said first portion. The second portion 15 extends sufficiently through the aperture and outwardly from the end wall to provide a means for externally operating the potentiometer. To maintain a proper contact pressure between a roller wiper 22 and a resistance element 41 a leaf spring 18 is attached by conventional means such as welding to one end surface 19 of the first portion 14 of the shaft 12. The spring 18 includes, at one end thereof, a connector clip portion 20 which is formed into a shape adapted to provide a means to make electrical connection between an external circuit and the potentiometer.

A roller wiper support shaft 21 is attached by conventional means such as welding to the leaf spring 18 and extends radially from the one end surface 19 of the shaft 12 sufficiently to carry the roller wiper 22. Rotation of the roller wiper 22 is constrained or limited by means of a flanged sleeve 24, which may be attached as by welding, including a mechanical stop portion 25 which projects from the first end adjacent the leaf spring 18 sufficiently to enable it to make contact under predetermined conditions with the leaf spring 18 to limit the rotation to a fraction of a revolution. A hair-spring 28 is attached at one end 31 thereof to the flanged sleeve 24 by conventional means such as having a plurality of loops, shown here typically as three loops welded to the sleeve 24. The other end 34 of the hair-spring 28 is attached to the first portion 14 of the shaft 12 by the insertion thereof into a spring-like connection 35 extending radially from the first portion 14 of the shaft 12. The hair-spring is adjusted to preload the wiper 22 to position it under zero force conditions in the center of the degrees of arc of the rotation of the wiper 22. Intermediate the two attached ends 31, 34 of the hair-spring 28 the hair-spring is formed into a plurality of loops 30 which circumscribe the roller wiper 22 and sleeve 24 in a noncontact relationship. Since one end 34 of the hair-spring 28 is attached to the first portion 14 of the shaft 12 and the other end 31 is attached to the flanged sleeve 24, the hair-spring completes an electrical circuit between wiper 22 and an external circuit connected to connector 20.

Circumscribing the cavity 11 and cemented to the inner surface 38 thereof is a continuous resistance member 39. The resistance member 39 comprises a core 40 having nonconductive properties typically comprising a material such as a paper base fiber and a continuous resistance element 41 connected to terminal brackets 44 and to leads 42 adapted for connection to an external source of electrical potential (not shown). The continuous resistance element 41 is wound into loops or windings continuously around the core 40 to provide an unbroken electrical path around the inner surface 38 of the cavity 11.

Referring specifically to FIGURE 2, a more detailed description of the structure and operation of the constrained roller wiper 22 will be made. The roller wiper 22 comprises a cylinder of a low contact resistance material, such as a platinum alloy, having a continuous bore 23 extending longitudinally thereof. A cylindrical bearing retaining sleeve 26 having an outside diameter substantially the same as inside diameter of the bore 23 is inserted into said bore. A pair of conventional bearings 27, 27a, are inserted into the bore 23 into abutting relationship with the ends of sleeve 26. While the bearings 27, 27a are each shown and described herein as a jewel bearing, typically comprising a material such as sapphire but not specifically limited thereto, another bearing, such as a roller bearing, may be substituted therefor without varying from the scope of the present invention. The roller wiper support shaft 21 extends through central apertures in the bearings and includes a flanged portion 29 at one end thereof. The flanged portion 29 holds the jewel bearing 27 in contact with the sleeve 26. The shaft 21 is supported within the roller wiper 22 by the jewel bearings 27, 27a.

As the potentiometer shaft 12 is rotated, by the operation on the second portion 15 thereof of an external force, the roller wiper 22 rotates over the windings of resistance element 41 until the mechanical stop 25 strikes the leaf spring 18. At this point, with the roller wiper 22 constrained it begins to slide along on the windings of the element 41. If the direction of rotation is changed the wiper will roll until the stop 25 hits the opposite side of the leaf spring and then will slide as the shaft 12 is rotated further. For small angular motions such as are caused by dither or by vibration the wiper will roll back and forth without constraint.

Although the now preferred embodiments of the present invention have been illustrated and described it is to be understood that the invention need not be limited thereto for its susceptible change in form, detail and application within the scope of the appending claims.

We claim:

1. A potentiometer comprising:
a resistance element including means for connecting said element in an electrical circuit;
a rotable shaft member adapted to have an external force applied thereto produce rotation thereof;
a constrainable roller wiper member attached to said shaft member for movement therewith including a cylindrical portion adapted to rotatably engage said resistance element when the radial movement of said shaft is below a predetermined magnitude and to slidably engage said resistance element when said radial movement is above said predetermined magnitude; and
a mechanical stop member attached to said cylindrical portion and adapted to engage said shaft member to restrict the rotation of said cylindrical portion when the radial movement of said shaft reaches said predetermined magnitude.

2. A potentiometer comprising:
a resistance element including means for connecting said element in an electrical circuit;
a rotatable shaft member adapted to have an external force applied thereto to produce rotation thereof;
a constrainable roller wiper member attached to said shaft member for movement therewith including a cylindrical portion adapted to rotatably engage said resistance element when the radial movement of said shaft is below a predetermined magnitude and to slidably engage said resistance element when said radial movement is above said predetermined magnitude; and
a mechanical stop member attached to said cylindrical portion and adapted to engage said shaft member to restrict the rotation of said cylindrical portion to less than one complete revolution.

3. A potentiometer comprising:
a housing including a cavity;
a resistance element arranged circumferentially of said cavity including means for connecting said element in an electrical circuit;
a rotatable shaft member extending coaxially of said cavity and having a portion projecting outwardly from one end of said housing adapted to have a rotation producing force applied thereto;
a roller wiper support shaft rigidly mounted on said rotatable shaft for movement therewith and having a portion extending radially therefrom;
a constrainable roller wiper member mounted on the radially extending portion of said support shaft including a cylindrical portion adapted to rotatably engage said resistance element when the radial movement of said shaft is below a predetermined magnitude and to slidably engage said resistance element when said radial movement is above said predetermined magnitude; and
means attached to said cylindrical portion and adapted to engage said shaft member to restrict the rotation of said cylindrical portion when the radial movement of said shaft reaches said predetermined magnitude.

4. A potentiometer comprising:
a housing including a cavity;
a resistance element arranged circumferentially of said cavity including means for connecting said element in an electrical circuit;
a rotatable shaft member extending coaxially of said cavity and having a portion projecting outwardly from one end of said housing adapted to have a rotation producing force applied thereto;
a roller wiper support shaft rigidly mounted on one end of said rotatable shaft for movement therewith and having a portion extending radially therefrom;
a constrainable roller wiper member mounted on the radially extending portion of said support shaft including a cylindrical portion adapted to rotatably engage said resistance element when the radial movement of said shaft is below a predetermined magnitude and to slidably engage said resistance element when said radial movement is above said predetermined magnitude; and
a mechanical stop member attached to said cylindrical portion and adapted to engage said shaft member to restrict the rotation of said cylindrical portion when the radial movement of said shaft reaches said predetermined magnitude.

5. A potentiometer comprising:
a housing including a cavity;
a resistance element arranged circumferentially of said cavity including means for connecting said element in an electrical circuit;
a rotatable shaft member extending coaxially of said cavity and having a portion projecting outwardly from one end of said housing adapted to have a rotation producing force applied thereto;
a roller wiper support shaft rigidly mounted on one end of said rotatable shaft for movement therewith and having a portion extending radially therefrom;
a constrainable roller wiper member mounted on the radially extending portion of said support shaft including a cylindrical portion adapted to rotatably engage said resistance element when the radial movement of said shaft is below a predetermined magnitude and to slidably engage said resistance element when said radial movement is above said predetermined magnitude; and
a mechanical stop member attached to said cylindrical portion and adapted to engage said shaft member to restrict the rotation of said cylindrical portion to less than one complete revolution.

6. A potentiometer comprising:
a housing including a cavity;
a resistance element arranged circumferentially of said cavity including means for connecting said element in an electrical circuit;
a rotatable shaft member extending coaxially of said cavity and having a portion projecting outwardly from one end of said housing adapted to have a rotation producing force applied thereto;
a roller wiper support shaft rigidly mounted on one end of said rotatable shaft for movement therewith and having a portion extending radially therefrom;
a constrainable roller wiper member for providing a movable intermediate electrical contact to said resistance element, said member being rotatably mounted on the radially extending portion of said roller wiper support shaft and including a cylindrical portion adapted to rotatably engage said resistance element when the radial movement of said shaft is below a predetermined magnitude and to slidably engage said resistance element when said radial movement is above said predetermined magnitude;
a mechanical stop member attached to said cylindrical portion and adapted to engage said shaft member to restrict the rotation of said cylindrical portion to less than one complete revolution; and
a spring member for positioning said wiper member relatively to said resistance element, said spring member having one end attached to said wiper member and the other end to said rotatable shaft member.

References Cited in the file of this patent

UNITED STATES PATENTS

| | | |
|---|---|---|
| 1,585,214 | Szukalski et al. | May 18, 1926 |
| 2,368,710 | Hessey | Feb. 6, 1945 |
| 2,452,490 | Payne | Oct. 26, 1948 |
| 2,519,752 | Fox | Aug. 22, 1950 |
| 2,595,189 | Dewan | Apr. 29, 1952 |
| 2,934,733 | Green et al. | Apr. 26, 1960 |